April 18, 1967 J. R. WHITBREAD 3,315,179

AMPLITUDE-STABILIZED OSCILLATION GENERATORS

Filed Oct. 11, 1965

2 Sheets-Sheet 1

INVENTOR
JOHN RAYMOND WHITBREAD
BY
Kirschstein, Kirschstein & Ottinger
ATTORNEYS INVENTOR
JOHN RAYMOND WHITBREAD
BY Kurschtens, Kurschtens & Ottinger
ATTORNEYS

United States Patent Office 3,315,179

Patented Apr. 18, 1967

3,315,179

AMPLITUDE-STABILIZED OSCILLATION GENERATORS

John Raymond Whitbread, Coventry, England, assignor to The General Electric Company Limited, London, England Filed Oct. 11, 1965, Ser. No. 494,584
Claims priority, application Great Britain, Oct. 14, 1964, 41,929/64
9 Claims. (Cl. 331—116)

This invention relates to electric circuit arrangements.

More particularly, but not exclusively, this invention relates to electric oscillatory signal generator arrangements incorporating zener diodes which are utilized to effect stabilization of the oscillatory signal supplied by the generator.

In known forms of electric oscillatory signal generator arrangements in which the signal is generated by means of a junction transistor, the amplitude of the signal is stabilized by controlling the values of the unidirectional voltage bases which are applied to the transistor.

This control is often effected by providing a zener diode connected across the base electrode-emitter electrode junction of the transistor, which diode is arranged to operate in its reverse biased condition.

When operating in this manner the diode presents an appreciable resistance to the flow of unidirectional current through it, and any change in the value of this current, brought about for example by a change in the value of the unidirectional voltage supply to the arrangement, will bring about a change in the potential difference across the diode. Thus the biases applied to the emitter and base electrodes of the transistor will be affected and the amplitude of the oscillatory signal generated thereby will be altered.

It is an object of the present invention to provide an electric circuit arrangement, which may form part of an electric oscillatory signal generator arrangement, wherein the above discussed problem is overcome to a substantial degree.

According to one aspect of the present invention an electric circuit arrangement comprises a transistor having three electrodes, a zener diode connected between a first and a second of said electrodes, unidirectional voltage supply means connected between said first and the third of said electrodes and means to supply a unidirectional current of substantially constant magnitude to said zener diode, the arrangement being such that during use said zener diode operates to maintain a substantially stable potential difference between said first and second electrodes thereby to maintain substantially constant the magnitude of the unidirectional current flowing between said first and third electrodes despite variations in the value of said unidirectional voltage supply, at least over a wide range of values of said unidirectional voltage supply.

According to another aspect of the present invention in an electric oscillatory signal generator arrangement there are provided a zener diode, a transistor having three electrodes, said zener diode being arranged to determine the potential difference between a first and a second of said electrodes, and means to supply a unidirectional current of substantially constant magnitude to said zener diode thereby rendering said potential difference substantially stable.

Said transistor may operate to generate the oscillatory signal, or it may function as a subsequent amplifier stage of the arrangement.

According to another aspect of the present invention an electric oscillatory signal generator arrangement comprises first and second electric circuits each including at least one transistor, one of said circuits being arranged to generate an oscillatory signal and the other of said circuits being arranged to amplify said oscillatory signal and pass it to the output of the arrangement, a zener diode which is arranged to carry the unidirectional current which flows in the main current path of the transistor in said first circuit (or a unidirectional current the value of which is dependent upon the current flowing in the main current path of the transistor in said first circuit), means to bias the transistor in said second circuit in dependence upon the potential difference developed across said zener diode, and means to bias the transistor in said first circuit in dependence upon the value of the unidirectional current flowing in the main current path of the transistor of said second circuit, the arrangement being such that the biases thus applied to the transistors in said first and second circuits tend to stabilize the amplitude of the oscillatory signal supplied by the arrangement, during use, against variations in value of the unidirectional voltage supply to said first and second circuits.

According to a further aspect of the present invention an electric oscillatory signal generator arrangement comprises first and second points, unidirectional voltage supply means connected between said first and second points, first and second transistors each having three electrodes, a first resistive element connecting a first electrode of said first transistor to said first point, a second resistive element connecting a second electrode of said first transistor to said second point, a third resistive element connecting a first electrode of said second transistor to said second point, a zener diode connecting a second electrode of said second transistor to said first point, a connection between the third electrode of said first transistor and the end of said zener diode remote from said first point, a connection between the third electrode of said second transistor and the end of said second resistive element remote from said second point, one of said transistors being arranged to generate an oscillatory signal which is supplied by way of the other of said transistors to first and second output terminals connected to said first and second electrodes of said other of said transistors respectively, the arrangement being such that, during use, the value of the unidirectional current flowing in said zener diode is maintained substantially stable and independent of the value of said unidirectional voltage supply, at least over a wide range of values of said unidirectional voltage supply, said zener diode thus operating to maintain a substantially stable potential difference between said first and third electrodes of said first transistor, the amplitude of the oscillatory signal appearing at said output terminals being thereby rendered substantially stable.

One embodiment of an electric oscillatory signal generator arrangement, and a modification thereof, will now be described by way of example with reference to the accompanying drawings in which—

Figure 1:
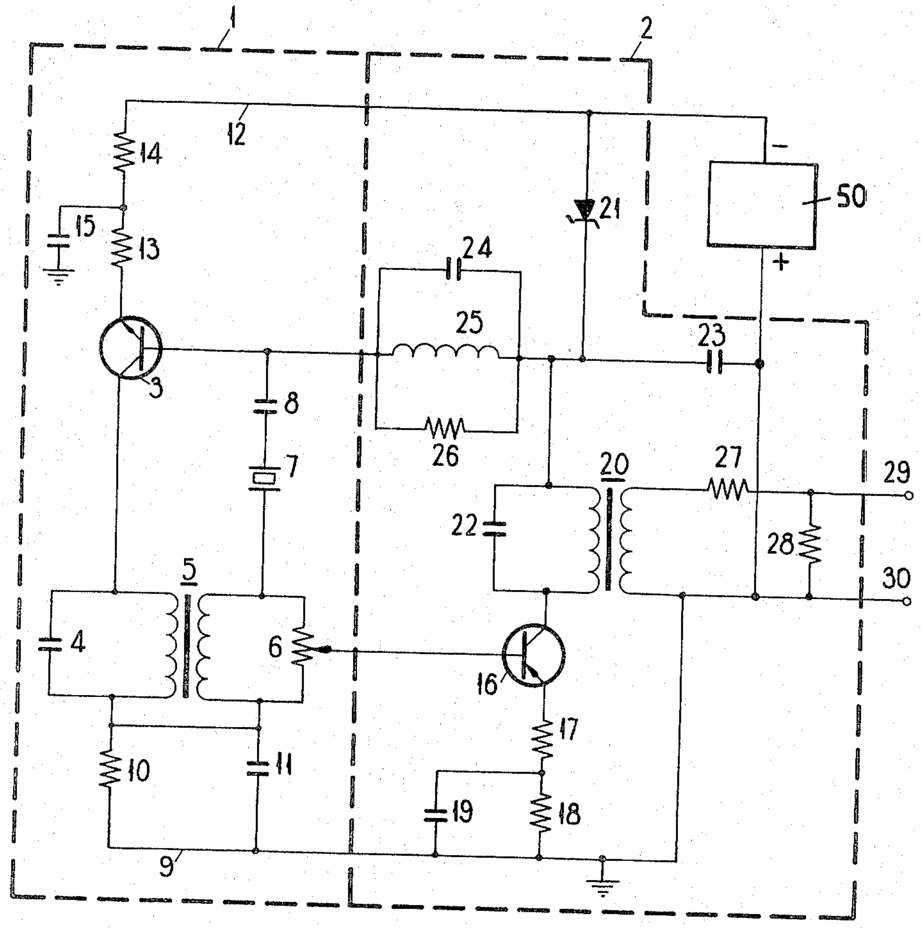
FIGURE 1 is a circuit diagram of the arrangement.

Referring now to FIGURE 1, the arrangement comprises an oscillator circuit 1 and an amplifier stage 2.

The oscillator circuit 1 includes an n-p-n junction transistor 3 which is provided with a feedback path between its collector and base electrodes, this feedback path comprising a capacitor 4, a transformer 5, a resistor 6, a crystal 7, and a capacitor 8. One end of each of the windings of the transformer 5 is connected to an earth line 9 by way of a resistor 10 and a capacitor 11. The emitter electrode of the transistor 3 is connected to a supply line 12 by way of two resistors 13 and 14, the junction between these two resistors 13 and 14 being connected to earth by way of a capacitor 15.

The amplifier stage 2 includes p-n-p junction transistor 16. The emitter electrode of the transistor 16 is connected to the earth line 9 by way of two resistors 17 and 18, the junction between these resistors 17 and 18 being connected to the earth line 9 by way of a capacitor 19. The collector electrode of the transistor 16 is connected to the supply line 12 by way of the primary winding of a transformer 20 and a zener diode 21, the primary winding of the transformer 20 being bridged by a capacitor 22. The junction between the primary winding of the transformer 20 and the zener diode 21 is connected to earth by way of a capacitor 23, and to the base electrode of the transistor 3 in the oscillator circuit 1 by way of a parallel arrangement of a capacitor 24, an inductor 25, and a resistor 26. The base electrode of the transistor 16 is connected to a tapping point on the resistor 6 in the oscillator circuit 1. The output from the arrangement is derived from across the secondary winding of the transformer 20, and is supplied by way of two resistors 27 and 28 to output terminals 29 and 30.

During operation of the arrangement the supply line 12 is nominally maintained at a potential of minus thirteen and a half volts with respect to the earth line 9 by a source 50.

The operation of the arrangement is then as follows.

Consider first the alternating current operation of the arrangement.

The transistor 3 operates in known manner to generate an oscillatory signal the frequency of which is determined by the resonant frequency of the crystal 7 and the amplitude of which is determined by the values of the unidirectional voltage biases which are applied to the electrodes of the transistor 3. This oscillatory signal is supplied to the transistor 16 across its base-emitter junction from the earth line 9 and the tapping point on the resistor 6, is amplified by the transistor 16 and then passes from the collector electrode of the transistor 16 by way of the transformer 20 to the output terminals 29 and 30.

Consider now the unidirectional operating voltage supply of the arrangement.

For the sake of simplicity this will be described by way of reference to only four components, namely the transistors 3 and 16, the resistor 10, and the zener diode 21, and two paths between the lines 9 and 12 will be considered, the first comprising the resistor 10 and the emitter-collector path of the transistor 3, and the second comprising the emitter-collector path of the transistor 16 and the zener diode 21.

The zener diode 21 is arranged so as to operate in its reverse biased condition and is connected so as to determine the potential difference across the base-emitter junction of the transistor 3. In order that the oscillatory signal generated by the transistor 3 may have a substantially stable amplitude it is necessary for the potential difference across the base-emitter junction of the transistor 3 to be substantially stable, and in order for this to be so it is necessary to maintain the value of the unidirectional current flowing in the zener diode 21, and thus in the emitter-collector path of the transistor 16, substantially stable.

The value of the unidirectional current flowing in the emitter-collector path of the transistor 16 is dependent upon the potential difference across the base-emitter junction of the transistor 16. This potential difference is determined by the voltage drop across the resistor 10, which voltage drop is dependent upon the value of the unidirectional current flowing in the resistor 10.

The unidirectional current flowing in the resistor 10 also flows in the emitter-collector path of the transistor 3, and therefore its value is dependent upon the potential difference across the base-emitter junction of the transistor 3 which, as previously stated, is determined by the zener diode 21.

Thus, provided that the potential difference between the lines 9 and 12 is of sufficient magnitude to maintain the zener diode 21 in its reverse biased condition, the value of the unidirectional current flowing in each of the two previously specified paths is maintained substantially constant.

This ensures that the potential difference across the zener diode 21, and hence across the base-emitter junction of the transistor 3, is maintained substantially stable, and thus the amplitude of the oscillatory signal generated by the transistor 3, and hence of the oscillatory signal supplied by the arrangement, is maintained substantially stable.

The arrangement described has the advantage that variations in the value of the potential difference between the lines 9 and 12, brought about for example by decay of the cells if the unidirectional voltage source is a battery, does not have an adverse effect on the amplitude of the oscillatory signal supplied by the arrangement.

As a modification of the arrangement described above the positions of the zener diode 21 and the resistor 10 may be reversed, the zener diode 21 being connected with its direction of forward conduction towards the earth line 9.

With this modified arrangement the zener diode operates to maintain a substantially stable potential difference across the base-emitter junction of the amplifier transistor 16, and again the value of the unidirectional current flowing in each of the two previously specified paths, as now modified, is maintained substantially stable, and thus the amplitude of the oscillatory signal supplied by the arrangement is maintained substantially stable.

Figure 2:
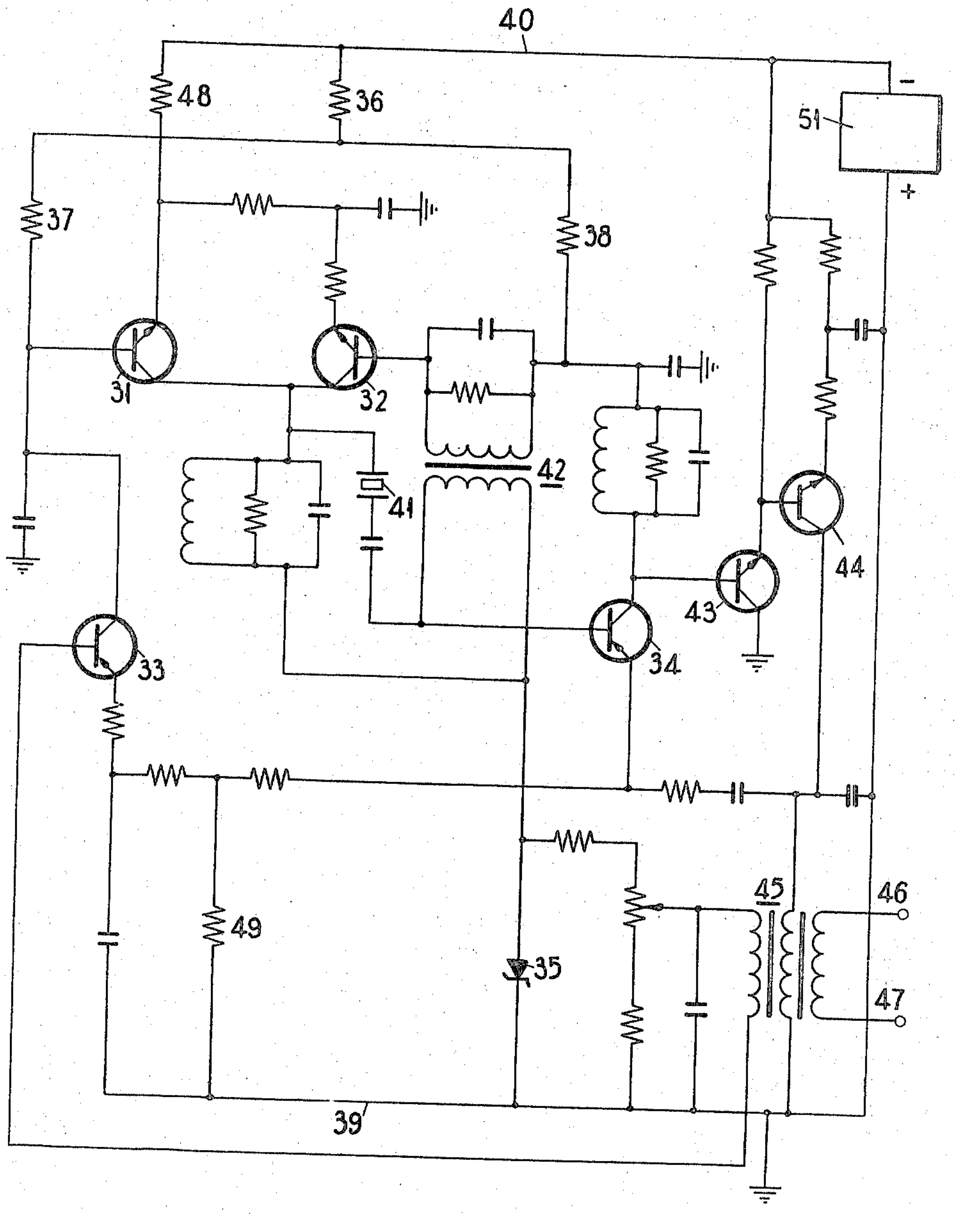
FIGURE 2 is a circuit diagram of the modified arrangement.

Referring now to FIGURE 2, the oscillatory signal generator transistor 3 of FIGURE 1 is replaced by a pair of n-p-n junction transistors 31 and 32, and the amplifier transistor 16 of FIGURE 1 is replaced by a pair of p-n-p junction transistors 33 and 34, at least as far as the unidirectional voltage conditions of the arrangement are concerned.

A zener diode 35 is connected across the base-emitter junction of each of the transistors 33 and 34, and a resistor 36 is connected in series with a respective one of two resistors 37 and 38 across the base-emitter junction of each of the transistors 31 and 32.

Considering again, as in the case of FIGURE 1, two paths between the earth line 39 and the supply line 40, one path comprises the zener diode 35 in series with the emitter-collector path of each of the transistors 31 and 32, and the other path comprises the parallel arrangement of the emitter-collector path of the transistor 33 and the resistor 37, and the emitter-collector path of the transistor 34 and the resistor 38, in series with the resistor 36. The arrangement operates to maintain the value of the unidirectional current flowing in each of these two paths substantially constant and thus the potential difference across the base-emitter junction of each of the transistors 31, 32, 33, and 34 is maintained substantially stable.

Considering the alternating current conditions of the arrangement, the transistor 32 is provided with a feedback path between its collector and base electrodes, this feedback path including a crystal 41 and a transformer 42. The transistor 32 operates in known manner to generate an oscillatory signal, the frequency of which is determined by the crystal 41 and the amplitude of which is determined by the unidirectional voltage biases applied to the electrodes of the transistor 32. This signal is supplied to the transistor 34, is amplified thereby, and then passes by way of two n-p-n transistors 43 and 44 to an output transformer 45 and hence to output terminals 46 and 47. Part of the signal appearing at the transformer 45 is applied to the base electrode of the transistor 33 as negative feedback so as to reduce the degree of waveform distortion introduced by the amplifier transistors 34, 43 and 44.

The pairs of transistors 31 and 32, and 33 and 34 are arranged with a respective resistor 48 or 49 in the emitter electrode circuit of each of the transistors 31 and 32, or 33 and 34 of each pair. The transistors 31 and 32, or 33 and 34 in each pair thus operate together in known manner so as to counteract for any change in operating characteristics brought about for example by changes in temperature.

Thus, the unidirectional voltage biases applied to each of the transistors 31, 32, 33, and 34 are stabilized against variations in the potential difference supplied by the source 51 between the earth line 39 and the supply line 40, and the transistors 31, 32, 33, and 34 are arranged so as to be substantially unaffected by temperature variations, and thus the amplitude of the oscillatory signal supplied by the arrangement at output terminals 46 and 47 is maintained substantially stable.

I claim:

1. An electric oscillatory signal generator arrangement comprising first and second points, unidirectional voltage supply means connected between said first and second points, first and second transistors each having three electrodes, a first resistive element connecting a first electrode of said first transistor to said first point, a second resistive element connecting a second electrode of said first transistor to said second point, a third resistive element connecting a first electrode of said second transistor to said second point, a zener diode connecting a second electrode of said second transistor to said first point, a connection between the third electrode of said first transistor and the end of said zener diode remote from said first point, a connection between the third electrode of said second transistor and the end of said second resistive element remote from said second point, one of said transistors being arranged to generate an oscillatory signal which is supplied by way of the other of said transistors to first and second output terminals connected to said first and second electrodes of said other of said transistors respectively, the arrangement being such that, during use, the value of the unidirectional current flowing in said zener diode is maintained substantially stable and independent of the value of said unidirectional voltage supply, at least over a wide range of values of said unidirectional voltage supply, said zener diode thus operating to maintain a substantially stable potential difference between said first and third electrodes of said first transistor, the amplitude of the oscillatory signal appearing at said output terminals being thereby rendered substantially stable.

2. An electric oscillatory signal generator arrangement in accordance with claim 1 wherein said first transistor is an n-p-n junction transistor, said second transistor is a p-n-p junction transistor, and said first, second and third electrodes of said transistors are respectively emitter, collector and base electrodes.

3. An electric oscillatory signal generator arrangement in accordance with claim 1 wherein said first transistor is arranged to generate said oscillatory signal and said second transistor is arranged to amplify said oscillatory signal.

4. An electric oscillatory signal generator arrangement in accordance with claim 3 wherein the frequency of said oscillatory signal is determined by a piezo-electric crystal which is connected in a positive feedback path between the collector circuit of said first transistor and the base electrode of said first transistor.

5. An electric oscillatory signal generator arrangement comprising first and second transistors each having first, second and third electrodes and a first-to-second electrode current path through the transistor, a zener diode, first and second supply lines, unidirectional voltage supply means connected between said supply lines, means connecting the zener diode between said supply lines in series with the first-to-second electrode current path of said first transistor, means to apply a unidirectional bias voltage between the first and third electrodes of the second transistor the value of which is dependent upon the voltage developed across the zener diode, a resistive element, means to connect said resistive element between said supply lines in series with the first-to-second electrode path of said second transistor, means to apply a unidirectional bias voltage between the first and third electrodes of the first transistor the value of which is dependent upon the unidirectional component of the voltage developed across said resistive element, means connecting one of said transistors as the active element of an oscillator circuit, and means connecting the other transistor in a circuit to amplify the oscillatory output signal of said oscillator circuit, the arrangement being such that the bias voltages applied between the first and third electrodes of said transistors are substantially constant and the amplitude of the oscillatory signal supplied by the arrangement is thereby stabilized, during use, against variations in value of the unidirection supply voltage.

6. An electric oscillatory signal generator arrangement in accordance with claim 5 wherein the first and second transistors are junction transistors of opposite conductivity types.

7. An electric oscillatory signal generator arrangement comprising first and second electric circuits each including a pair of transistors of like conductivity type each transistor having first, second and third electrodes and a first-to-second electrode current path through the transistor, first and second supply ines, unidirectional voltage supply means connected between said supply lines, a zener diode, means connecting said zener diode to carry currents flowing between said first and second supply lines by way of the first-to-second electrode paths of the pair of transistors in said first circuit, means to apply a bias voltage between the first and third electrodes of the pair of transistors in said second circuit the value of which is dependent upon the voltage developed across said zener diode, means to apply a bias voltage between the first and third electrodes of the pair of transistors in said first circuit the value of which is dependent upon the values of the unidirectional currents flowing in the first-to-second electrode current paths of the transistors of the second circuit, means connecting one of said circuits as an oscillator and means connecting the other circuit to amplify the oscillatory output signal of said oscillator, the arrangement being such that the bias voltages applied to the transistors in said first and second circuits are substantially constant and the amplitude of the oscillatory signal supplied by the arrangement is thereby stabilized, during use, against variations in value of the unidirectional supply voltage.

8. An electric oscillatory signal generator arrangement in accordance with claim 7 wherein the pair of transistors in the first circuit are of opposite conductivity type to the pair of transistors in the second circuit, said transistors all being junction transistors.

9. An electric oscillatory signal generator arrangement in accordance with claim 7 wherein one of the pair of transistors in the first circuit is connected to form said oscillator and one of the pair of transistors in the second circuit is connected to amplify said output signal of the oscillator.

References Cited by the Examiner

UNITED STATES PATENTS

| | | | |
|---|---|---|---|
| 2,957,979 | 10/1960 | Kammer | 331—109 |
| 3,051,933 | 8/1962 | Cressey et al. | 331—117 |

ROY LAKE, *Primary Examiner.*

JOHN KOMINSKI, *Examiner.*